Dec. 22, 1936.  R. R. BOSTIC  2,064,880
HEADLIGHT
Filed March 19, 1935  2 Sheets-Sheet 1
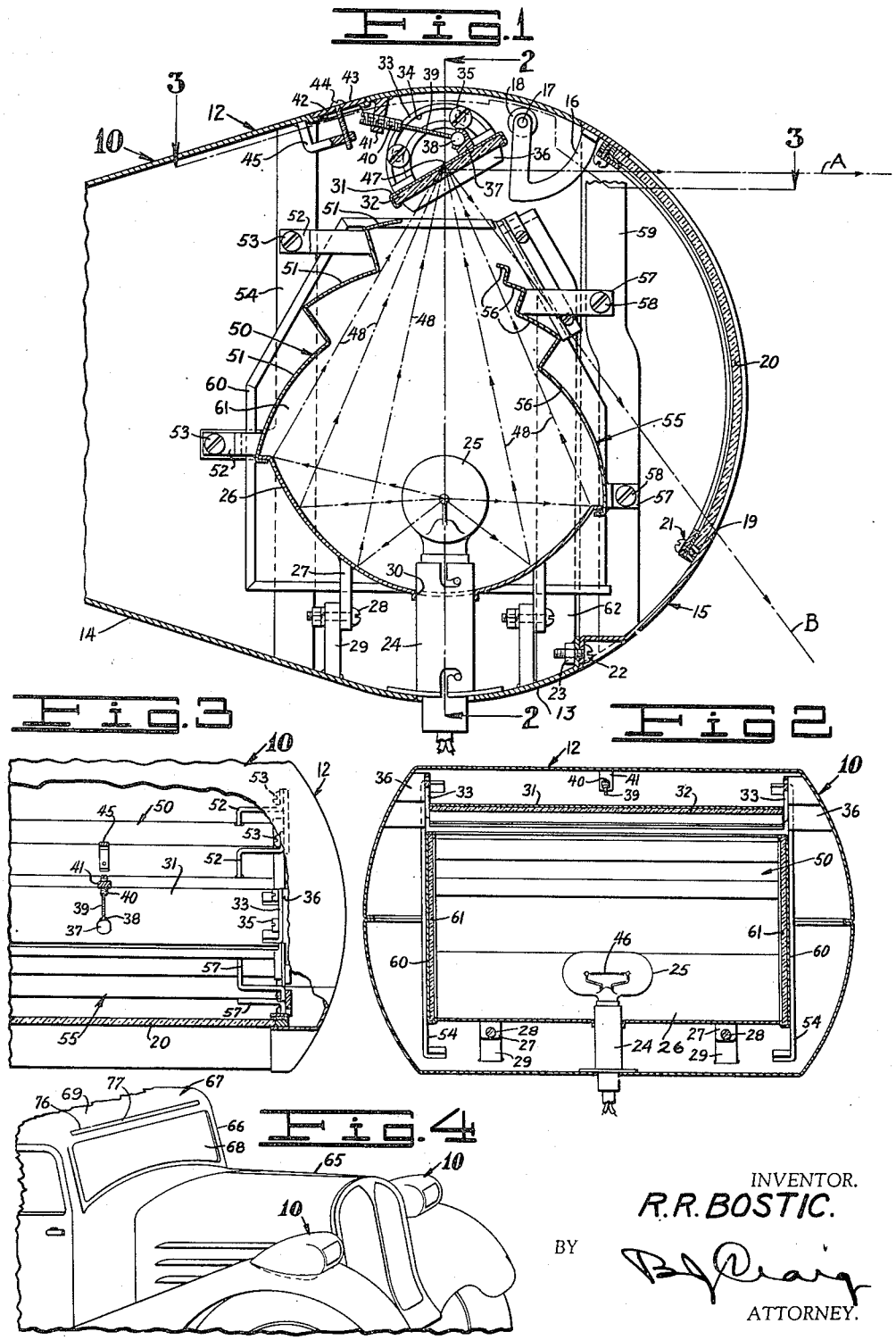
INVENTOR.
R. R. BOSTIC.
BY
ATTORNEY.

Dec. 22, 1936.  R. R. BOSTIC  2,064,880
HEADLIGHT
Filed March 19, 1935  2 Sheets—Sheet 2
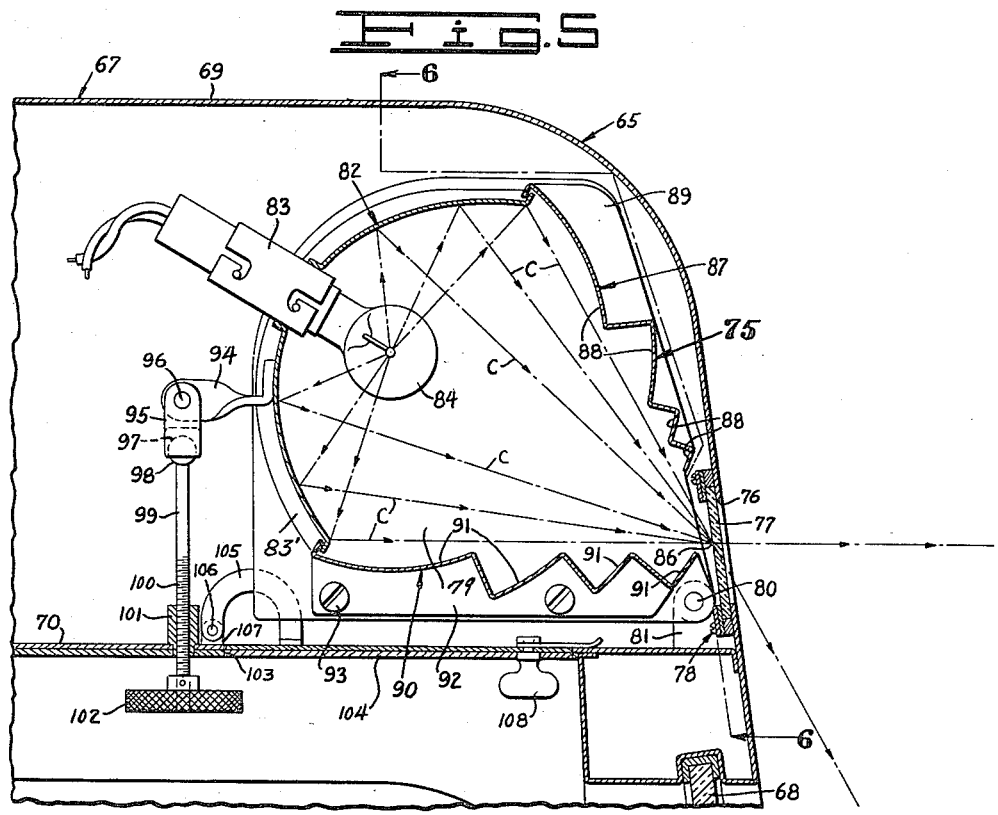
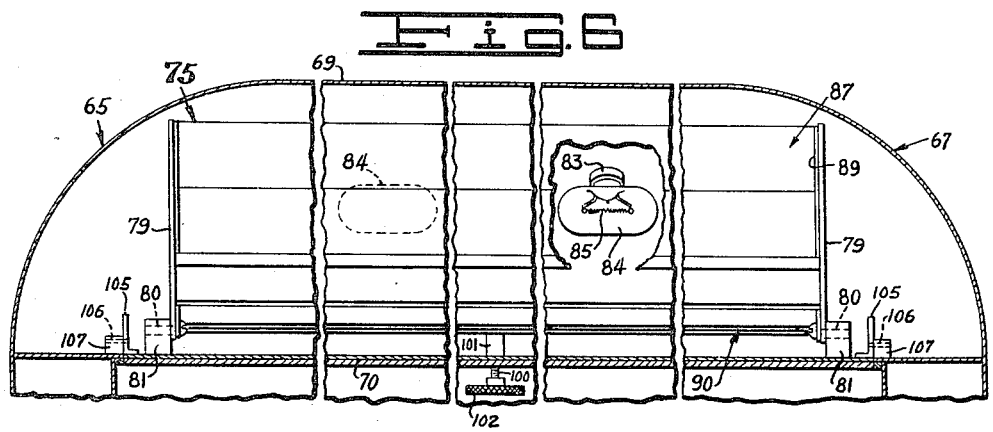
INVENTOR.
R. R. BOSTIC.
BY
ATTORNEY.

Patented Dec. 22, 1936

2,064,880

UNITED STATES PATENT OFFICE 2,064,880

HEADLIGHT

Ralph R. Bostic, Los Angeles, Calif.

Application March 19, 1935, Serial No. 11,825

5 Claims. (Cl. 240—41.1)

This invention relates to improvements in head lights.

The general object of the invention is to provide an improved head light for use on vehicles such as automobiles.

Another object of the invention is to provide an improved anti-glare head light for automobiles.

A further object of the invention is to provide a head light which will project the rays in fan shape laterally but will not project light rays above a predetermined height.

A still further object of the invention is to provide a head light constructed in such a manner as to utilize a maximum amount of light rays from the bulb thereof.

Other objects and the advantages of this invention will be apparent from the following description taken in connection with the accompanying drawings, wherein:

Fig. 1 is a fragmentary vertical section through my improved headlight.

Fig. 2 is a section taken on line 2—2 of Fig. 1 on a reduced scale.

Fig. 3 is a section taken on line 3—3 of Fig. 1 on a reduced scale.

Fig. 4 is a fragmentary perspective view of an automobile showing my improved head lights operatively mounted therein.

Fig. 5 is an enlarged fragmentary section of the automobile shown in Fig. 4, showing a modified form of light, and Fig. 6 is a section taken on line 6—6 of Fig. 5 on a reduced scale.

Referring to the drawings by reference characters, I have indicated my improved head light generally at 10.

As shown the headlight 10 includes a housing member 12 having a curved forward portion as indicated by 13 with the front of the housing open and a tapered rear portion as indicated by 14. The front of the housing 12 is closed by a cap member 15 which is curved to match the curvature of the housing.

Adjacent each side of the housing the cap 15 has a hinged arm 16 welded or otherwise secured thereto, which is pivotally mounted as at 17 to a block member 18 on the housing. The cap 15 has an aperture 19 therein which is closed by a glass member 20 which is curved to match the curvature of the cap 15. The glass 20 may be secured to the cap 15 in any desired manner as by rails and screws as indicated at 21. The lower end of the cap is shown as secured to the housing 12 by bolts 22 which engage nuts 23 which are welded or otherwise secured to the housing.

Suitably mounted on the bottom of the housing and extending upward therefrom I provide a standard type electric bulb socket 24 in which an electric light bulb 25 is removably positioned.

Positioned in the housing 12 adjacent the bottom thereof, I provide a metal reflector member 26. The reflector 26 is shown as including a plurality of depending legs 27 which are secured by bolts 28 to upstanding legs 29 on the housing 12. The reflector 26 has an aperture 30 therein through which the socket member 24 projects. As clearly shown in Fig. 1 the reflector member 26 is elliptical in cross section and extends from adjacent one side of the housing to adjacent the other side thereof. (See Fig. 2).

Above the reflector 26 adjacent the top of the housing I provide a frame member 31 which supports a glass or other mirror 32 in a downwardly facing direction. Adjacent each end the frame 31 has an arcuate bracket 33 thereon which has an arcuate slot 34 therein. The brackets 33 are movably supported on bolts 35 which are positioned in the slot 34 and threadedly engage blocks 36 on the housing 12. The frame 31 includes a ball socket member 37 in which a ball member 38 is positioned. The ball member 38 has a threaded stem 39 thereon which is threaded into an externally threaded bolt member 40 which is positioned in a threaded boss 41 on the housing.

Adjacent the boss 41 the housing 12 has an aperture 42 therein which is closed by a plate 43. The plate 43 is retained in position by a bolt 44 which engages a threaded finger 45 on the housing. The bulb 25 is of a type wherein the filament 46 is straight and is positioned at right angles to the axis of the bulb socket.

The elliptical shape of the reflector 26 is such that the bulb filament 46 coincides with one focus and the light rays from the filament striking the reflector are reflected convergently upward to other focus 47 which is at the reflecting surface of the mirror 32 as indicated by the broken lines 48.

The mirror 32 is arranged so that the reflected beams from the reflector 26 will be reflected therefrom through the glass 20 in an area defined in Fig. 1 by lines A and B. The top line A extends from the mirror approximately horizontal, while the line B extends downward.

Adjacent the rear of the reflector 26, I provide a collector reflector 50 which extends upward from the reflector 26. The collector reflector 50 includes a plurality of segments of circular cylinders 51 whose centers coincide with the axis of the filament and which therefore reflect the rays from the bulb filament 46 back through a line coaxial with the axis of the filament of the bulb onto the reflector 26. The reflector 50 has a plurality of finger members 52 adjacent each end secured by bolts 53 to brackets 54 on the housing 12.

Adjacent the front of the reflector 26 I provide a collector reflector 55 which like the reflector 50 includes a plurality of segments of circular cylinders 56 whose centers coincide with the axis of the filament and which therefore reflect the rays from the bulb filament 46 back through a line coaxial with the axis of the filament of the bulb onto the reflector 26. The reflector 55 is shown as including a plurality of finger members 57 adjacent each end which are secured by bolts 58 to brackets 59 on the cap member 15.

The reflectors 50 and 55 are positioned so that they do not intercept the reflected rays 48 from the reflector 26 and the reflector 55 is positioned so that it does not intercept the reflected rays from the mirror 32.

At each end of the reflector 26 I provide a frame member 60 which supports a reflector member such as a mirror 61. Near the rear the frames 60 are welded or otherwise suitably secured to the brackets 54 and adjacent the front frames are welded or otherwise suitably secured to a bracket 62 on the housing 12. The reflectors 61 are arranged to reflect the rays from the filament 46 which strike them back onto the reflectors 26, 50, and 55.

Thus it will be seen that the majority of the rays from the filament 46 which do not originally strike the reflector 26 are eventually reflected onto this reflector 26 and are then directed onto the reflector 32.

In Fig. 4 I have shown a pair of my improved head lights 10 operatively mounted on an automobile 65 which includes a closed body 66 having a top portion 67 and a windshield 68.

As shown in Figs. 5 and 6 the top 67 of the automobile includes an outer portion 69 and a ceiling portion 70 spaced below the top portion 69.

In Figs. 5 and 6, I have shown a modification of my invention in a device indicated generally at 75. The device 75 is positioned in the top 67 of the automobile in the space between the top portion 69 and the ceiling portion 70 and adjacent the front of the automobile body. The automobile body 66 has an elongated aperture 76 therein above the wind shield 68 which is closed by a glass closure member 77. The glass closure member 77 may be secured to the body 66 in any desired manner as by rails and screws as indicated at 78.

As shown the device 75 includes a pair of spaced metal side plates 79 which adjacent their lower forward corners are pivoted as indicated at 80 to blocks 81 mounted on the ceiling 70. Between the end plates 79 I provide a metal reflector member 82 which is elliptical in cross section. At each end the reflector member 82 includes a flange portion 83' each of which are suitably secured as by welding to the adjacent end plate 79. Intermediate its length, the reflector member 82 includes a plurality of electric bulb sockets 83 in which electric light bulbs 84 are positioned. The light bulbs 84 are similar to the light bulb 25 previously described, having a filament 85 therein which is positioned at right angles to the axis of the bulb socket.

The reflector is elliptical in cross section so that when the bulb filament 85 is at one focus the light rays from the filaments striking the reflector will be convergently reflected to the other focus 86 which is at the rear of the glass closure member 77 as indicated by the lines C. The light rays cross at the point 86 and then pass through the glass closure 77.

Extending from one end plate 79 to the other, I provide a collector reflector 87. The reflector 87 includes parts 88 which are segments of circular cylinders and are similar to previously described collector reflectors 50 and 55, and are shaped to reflect the rays from the bulb filaments 85 back substantially through a line coaxial with the axis of the filament of the bulb onto the reflector 82. The collector reflector 87 includes a flange portion 89 at each end which are suitably secured as by welding to the end plates 79.

Below the reflector 82 I provide another collector reflector 90 which like the reflector 87 includes a plurality of curved sections 91 which are shaped to reflect the rays from the bulb filaments 85 back through a line coaxial with the axis of the filaments of the bulbs onto the reflector 82. The reflector 90 has a flange portion 92 at each end which is removably secured to the end plate 79 by bolts 93.

The inner faces of the end plates 79 are polished to form reflecting surfaces to reflect the rays from the filaments 85 which strike them back onto the reflectors 82, 87, and 90.

Thus it will be seen that the majority of the rays from the filaments 85 which do not originally strike the reflector 82 are eventually directed onto the reflector 82.

Mounted on the rear of the reflector 82 I provide a bracket member 94 on which a member 95 is pivotally mounted as indicated at 96. The member 95 includes a ball socket portion 97 in which a ball member 98 is positioned. The ball member 98 has a stem thereon which extends downward into the driver's compartment of the automobile. The stem 99 includes a threaded block 101 mounted on the ceiling 70.

In the driver's compartment the stem 99 has an enlarged head 102 thereon. By rotating the stem 99, reflectors 82, 87 and 90 may be swung about the axis of the pivots 80 to change the angle of the projected light rays.

The ceiling 70 has an aperture 103 therein which is closed by a closure member 104 which includes a hinge member 105 adjacent each end which is pivotally mounted as at 106 to a block member 107 mounted on the ceiling 70. The closure member 104 further includes a suitable fastening member 108 to retain it in a closed position.

From the foregoing description it will be apparent that I have provided a novel light device which is simple in construction and highly efficient in use.

Having thus described my invention, I claim:
1. In a head light, a housing, said housing having an aperture therein, a glass closure member over said aperture, a reflector member in said housing, said reflector comprising an elongated trough-like member elliptically shaped in transverse cross section, means to support said reflector in said housing, an electric bulb socket in said housing, an electric light bulb in said socket, said bulb having a straight filament therein positioned at right angles to the axis of said bulb socket and extending lengthwise of said reflector, a frame member positioned in said housing above said reflector, means to pivotally support said frame member, means to retain said frame member in adjusted position, a plane mirror mounted on said frame member, said reflector being disposed so that rays from said bulb filament striking the said reflector are convergently directed in a line towards said mirror, said mirror being arranged to direct said rays therefrom through said housing aperture, a collector reflector at each side of said first reflector, said collector reflectors extending upward and each including a plurality of segmental cylindrical surfaces each disposed and adapted to direct rays striking them back through a line coaxial with the axis of the filament of the bulb onto said first reflector, a frame adjacent each end of said first reflector, means to support said frames and a mirror member mounted on each of said end frames, said mirror members each being adapted to reflect rays from said bulb striking them onto said first reflector.

2. In a head light, a housing, said housing having an aperture therein, a closure member over said aperture, a reflector member in said housing, said reflector comprising an elongated trough-like member, means to support said reflector in said housing, an electric bulb socket in said housing, an electric light bulb in said socket, said bulb having a filament therein, a frame member positioned in said housing above said reflector, means to pivotally support said frame member, a plane mirror mounted on said frame member, said reflector being disposed so that rays from said bulb filament striking the said reflector are directed towards said mirror, said mirror being arranged to direct said rays therefrom through said housing aperture, a collector reflector at each side of said first reflector, said collector reflectors extending upward and each including a plurality of segmental cylindrical surfaces each disposed and adapted to direct rays striking them back through a line coaxial with the axis of the filament of the bulb onto said first reflector, a frame adjacent each end of said first reflector, means to support said frames and a mirror member mounted on each of said end frames, said mirror members each being adapted to reflect rays from said bulb striking them onto said first reflector.

3. A head light, said head light including a housing having a body, said body being of teardrop shape in longitudinal cross-section, said body having end members thereon, the large end of said body having an aperture therein, a closure for said aperture, a reflector member in said housing, said reflector member comprising an elongated trough-like member elliptically shaped in transverse cross-section and extending across said housing, means in the housing to support said reflector, an electric bulb socket mounted on said housing and extending to a position in advance of said reflector, an electric light bulb in said socket, said bulb having a straight elongated filament therein positioned at right angles to the axis of said bulb socket and extending lengthwise of said reflector, a pair of supplemental reflectors disposed at each side of said first reflector, said supplemental reflectors each comprising a plurality of segmental cylindrical surfaces connected by plane surfaces, the center of curvature of said segmental cylindrical surfaces coinciding with the axis of the rectilinear filament and with the focus of the elliptical reflector.

4. A head light, said head light including a housing having a body, said body being of teardrop shape in longitudinal cross-section, said body having end members thereon, the large end of said body having an aperture therein, a closure for said aperture, said closure being of a shape conforming to the tear drop shape of the housing and extending across said housing aperture, a reflector member in said housing, said reflector member comprising an elongated trough-like member elliptically shaped in transverse cross-section and extending across said housing, means in the housing to support said reflector, an electric bulb socket mounted on said housing and extending to a position in advance of said reflector, an electric light bulb in said socket, said bulb having a straight elongated filament therein positioned at right angles to the axis of said bulb socket and extending lengthwise of said reflector, a pair of supplemental reflectors disposed at each side of said first reflector, said supplemental reflectors each comprising a plurality of segmental cylindrical surfaces connected by plane surfaces, the center of curvature of said segmental cylindrical surfaces coinciding with the axis of the rectilinear filament and with the focus of the elliptical reflector.

5. A head light, said head light including a housing having a body, said body being of teardrop shape in longitudinal cross-section, said body having end members thereon, the large end of said body having an aperture therein, a frame surrounding said aperture, said frame having a light transmitting closure therein, said closure being of a shape conforming to the tear-drop shape of the housing and extending across said housing aperture, a reflector member in said housing, said reflector member comprising an elongated trough-like member elliptically shaped in transverse cross-section and extending across said housing, means in the housing to support said reflector, an electric bulb socket mounted on said housing and extending to a position in advance of said reflector, an electric light bulb in said socket, said bulb having a straight elongated filament therein positioned at right angles to the axis of said bulb socket and extending lengthwise of said reflector, a pair of supplemental reflectors disposed at each side of said first reflector, said reflector having projecting flanges thereon and said supplemental reflectors having flanges thereon engaging the flanges on said first reflector, said supplemental reflectors each comprising a plurality of segmental cylindrical surfaces connected by plane surfaces, the center of curvature of said segmental cylindrical surfaces coinciding with the axis of the rectilinear filament and with the focus of the elliptical reflector.

RALPH R. BOSTIC.